(12) United States Patent
Lieber et al.

(10) Patent No.: US 8,705,730 B2
(45) Date of Patent: Apr. 22, 2014

(54) ELLIPTIC CURVE CRYPTOGRAPHY WITH FRAGMENTED KEY PROCESSING AND METHODS FOR USE THEREWITH

(75) Inventors: Zeev Lieber, North York (CA); Thomas Jefferson Saremi, Mississauga (CA)

(73) Assignee: Morega Systems Inc., Toronto, Ontario (CA)

(*) Notice: Subject to any disclaimer, the term of this patent is extended or adjusted under 35 U.S.C. 154(b) by 316 days.

(21) Appl. No.: 12/978,488

(22) Filed: Dec. 24, 2010

(65) Prior Publication Data

US 2012/0163581 A1 Jun. 28, 2012

Related U.S. Application Data

(60) Provisional application No. 61/426,794, filed on Dec. 23, 2010.

(51) Int. Cl.
   *G06F 21/00* (2013.01)

(52) U.S. Cl.
   USPC .............................................. 380/28; 726/27

(58) Field of Classification Search
   USPC ........................................................ 380/28
   See application file for complete search history.

(56) References Cited

U.S. PATENT DOCUMENTS

| | | | |
|---|---|---|---|
| 6,209,091 B1 | 3/2001 | Sudia | |
| 6,411,716 B1 | 6/2002 | Brickell | |
| 7,095,851 B1 | 8/2006 | Scheidt | |
| 7,564,970 B2* | 7/2009 | Damgaard et al. | 380/28 |
| 2003/0048899 A1* | 3/2003 | Spacey | 380/37 |
| 2005/0002532 A1 | 1/2005 | Zhou | |
| 2009/0214030 A1 | 8/2009 | Price | |
| 2009/0262930 A1* | 10/2009 | Lambert | 380/46 |

FOREIGN PATENT DOCUMENTS

CA   2368307   9/2000

OTHER PUBLICATIONS

Vipul Gupta, Performance Analysis of Elliptic Curve Cryptography for SSL, Sep. 28, 2002, pp. 1-8.*
International Search Authority; International Search Report and Written Opinion; PCT Application No. PCT/IB2011/003231; 15 pages, Jun. 11, 2012.
International Search Authority; International Search Report and Written Opinion; PCT Application No. PCT/IB2011/003366; 11 pages; Sep. 7, 2012.

* cited by examiner

*Primary Examiner* — Kambiz Zand
*Assistant Examiner* — Ghodrat Jamshidi
(74) *Attorney, Agent, or Firm* — Garlick & Markison; Bruce E. Stuckman

(57) ABSTRACT

A cryptography module includes a key store having a plurality of storage locations for storing a private key as k key fragments. One or more crypto-processing segments each operate based on corresponding ones of the k key fragments to process a message in accordance with elliptic curve digital signature algorithm (ECDSA) to produce a signed message.

13 Claims, 8 Drawing Sheets

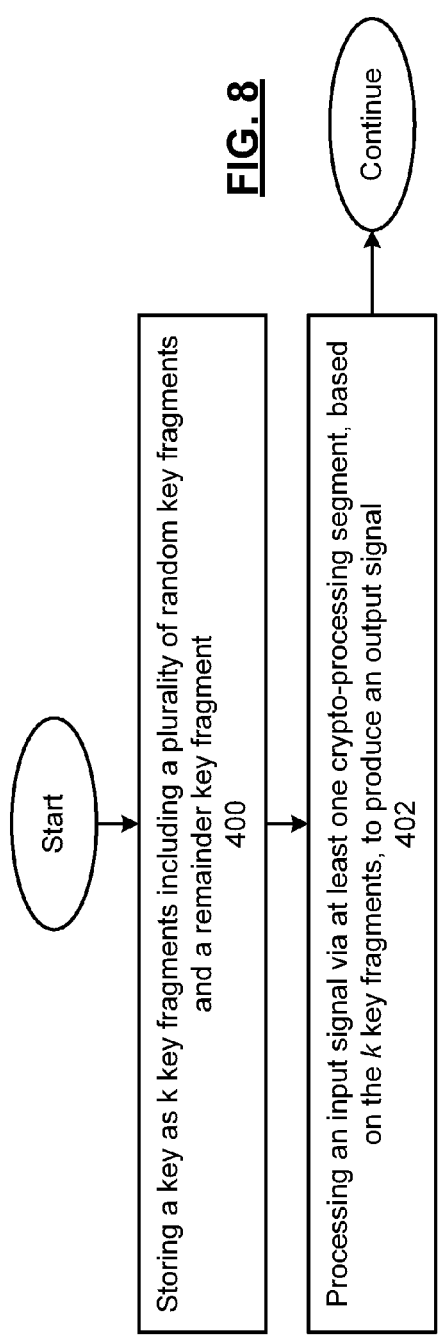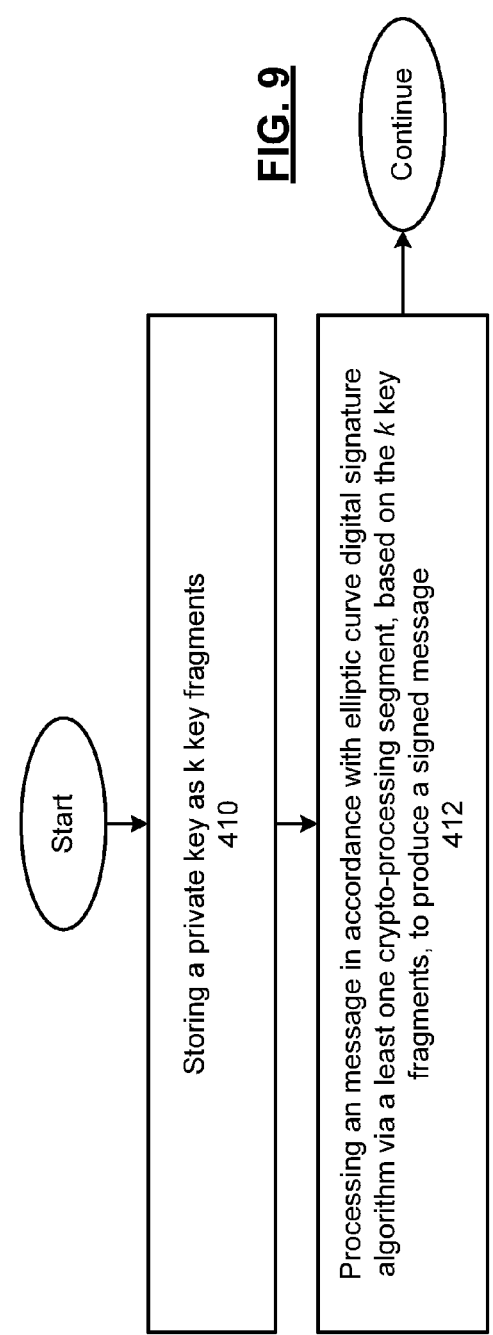

ELLIPTIC CURVE CRYPTOGRAPHY WITH FRAGMENTED KEY PROCESSING AND METHODS FOR USE THEREWITH

CROSS REFERENCES TO RELATED APPLICATIONS

The present application claims priority to the provisionally filed application entitled, "CRYPTOGRAPHY MODULE FOR USE WITH FRAGMENTED KEY AND METHODS FOR USE THEREWITH," having Ser. No. 61/426,794, filed on Dec. 23, 2010, the contents of which are incorporated herein by reference thereto.

TECHNICAL FIELD OF THE INVENTION

The present invention relates to decryption, digital signatures and public key cryptosystems.

DESCRIPTION OF RELATED ART

Encryption is commonly used to protect the security of content such as private messages, copyrighted content and other signals, content and other forms of data. Many encryption systems employ an encryption key that is used for encryption and/or for decrypting the data back into its original form.

Examples of such encryption systems include public key cryptosystems that use two different keys, one for encryption and the other for decryption. In such systems, the encryption algorithm and the encryption key (a public key) can be publicly revealed without compromising the security of the system. A special decryption key (the private key) is required to decrypt the encrypted data. Examples of public key cryptosystems include the Rivest, Shamir and Adelman (RSA) algorithm, elliptical curve cryptography (ECC) and others. The security of such systems depends on the security of the private key. Unauthorized access to the private key can lead to a breach in security.

Further limitations and disadvantages of conventional and traditional approaches will become apparent to one of ordinary skill in the art through comparison of such systems with the present invention.

BRIEF DESCRIPTION OF THE SEVERAL VIEWS OF THE DRAWINGS

FIG. 8 presents a flowchart representation of a method in accordance with an embodiment of the present invention.

FIG. 9 presents a flowchart representation of a method in accordance with an embodiment of the present invention.

DETAILED DESCRIPTION OF THE INVENTION INCLUDING THE PRESENTLY PREFERRED EMBODIMENTS

Figure 1:
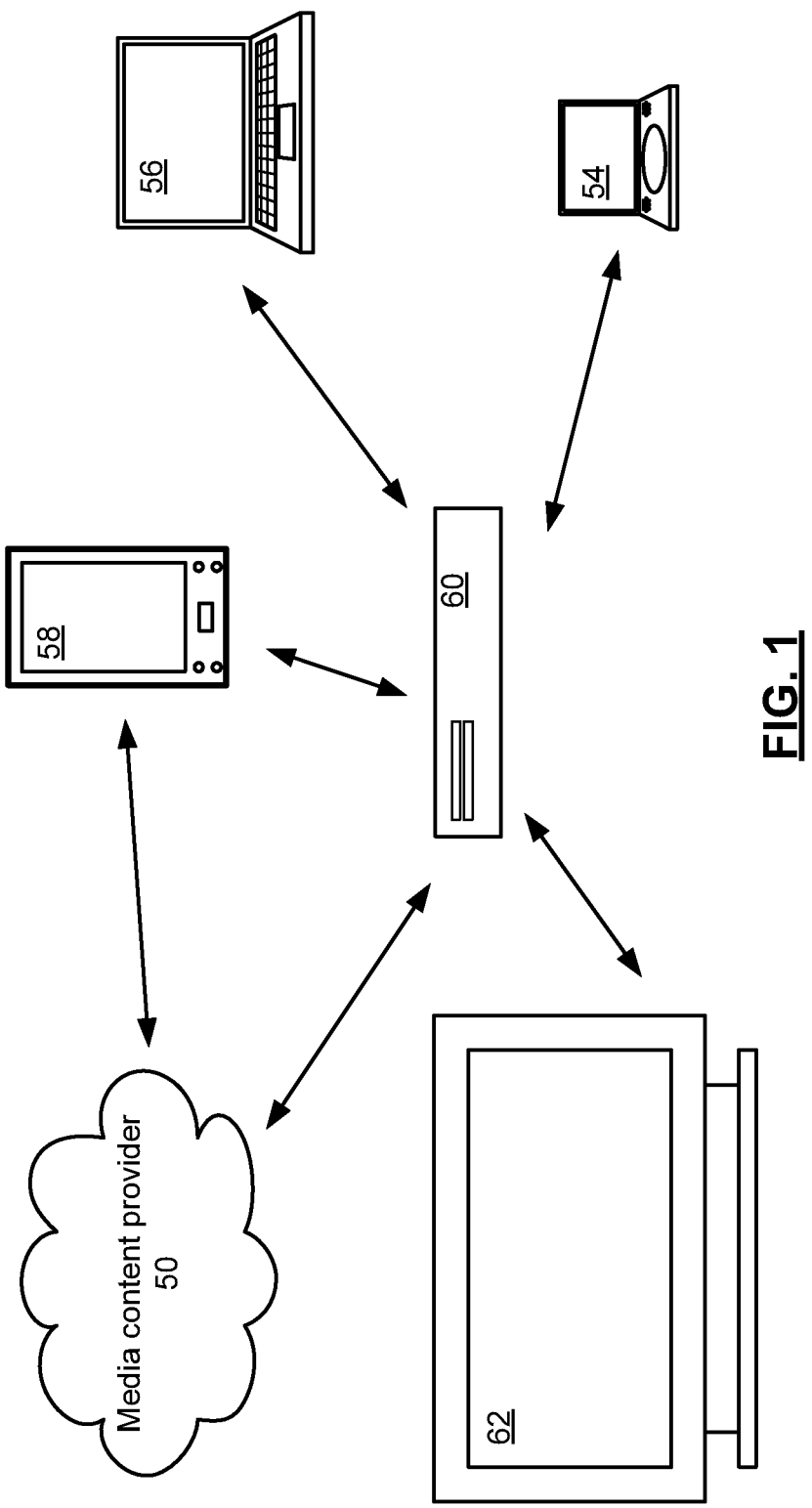
FIG. 1 presents a pictorial representation of a plurality of devices that incorporate cryptography in accordance with an embodiment of the present invention.

FIG. 1 presents a pictorial representation of a plurality of devices that incorporate cryptography in accordance with an embodiment of the present invention. In particular, handheld video player 58, such as a smart phone, internet tablet or other personal media player and gateway device 60, such as a set top box, digital video recorder, home gateway, server or other processing device are shown that can receive encrypted content such as a video data, audio data or other encrypted content from an external device such as media content provider 50.

In a further configuration, personal computer 56, video player 54, handheld video player 58 and television 62 can receive encrypted content via gateway device 60 or via a server, another set-top box, personal computer, wireless local area network (WLAN) access point, cable television receiver, satellite broadcast receiver, broadband modem, 3G or 4G transceiver or other gateway or device that is capable of transferring a encrypted content from media content provider 50 to the personal computer 56, video player 54, handheld video player 58 or television 62.

Gateway device 60, personal computer 56, video player 54, handheld video player 58 and/or television 62 include a cryptography module that includes one or more features of the present invention described further in conjunction with FIGS. 2-10 that follow.

Figure 2:
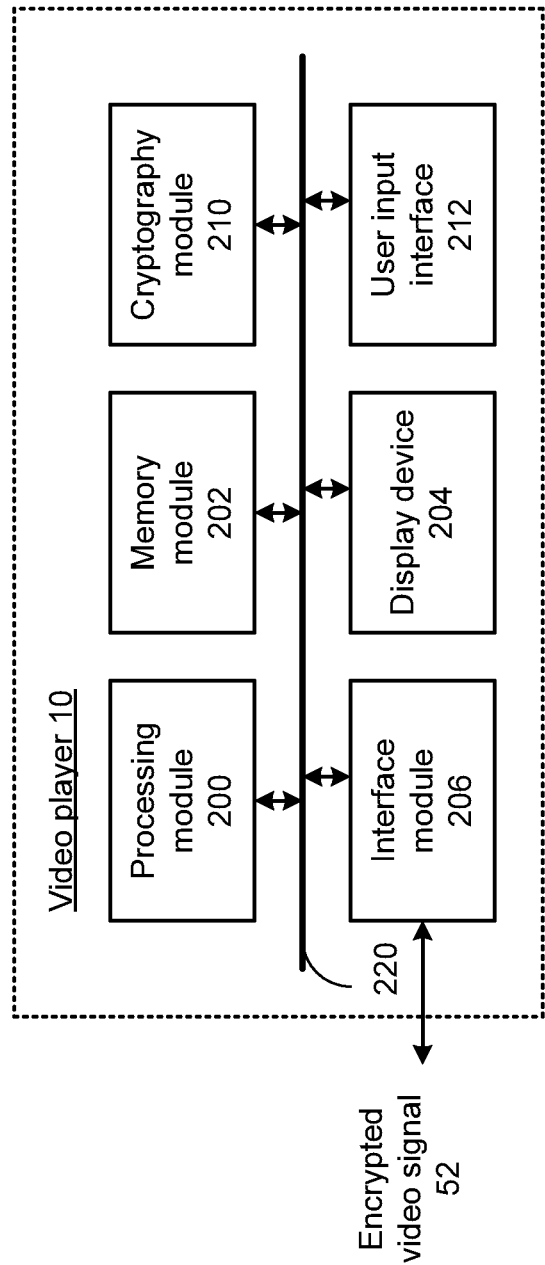
FIG. 2 presents a block diagram representation of video player 10 in accordance with an embodiment of the present invention.

FIG. 2 presents a block diagram representation of video player 10 in accordance with an embodiment of the present invention. In particular, a video player 10 is shown, such as gateway device 60, personal computer 56, video player 54, handheld video player 58 and/or television 62. Video player 10 includes a processing module 200, memory module 202, cryptography module 210, interface module 206, display device 204 and user input interface 212, that are coupled via bus 220. While a particular bus architecture is shown, other architectures that include two or more buses and/or direct connectivity between one or more modules of video player 10 are also possible within the scope of the present invention. Further, video player 10 can optionally include additional modules and components, for instance, for performing additional functions and features of the device, depending on its implementation.

The encrypted video signal 52 can include one or more video signals, optionally including associated audio signals that are either realtime signals in digital format or data files that contain video signals in a digital format. In general, such a video signal can be in a digital format such as a Motion Picture Experts Group (MPEG) format (such as MPEG1, MPEG2 or MPEG4), Quicktime format, Real Media format, H.264 format, Windows Media Video (WMV) or Audio Video Interleave (AVI), or another digital video format, either standard or proprietary. For instance, encrypted video signal 52 can be included in a broadcast video signal, such as a high definition television signal, enhanced high definition television signal or other digital broadcast video signal that has been transmitted over a wireless medium, either directly or through one or more satellites or other relay stations or through a cable network, optical network, IP television network, or other transmission network. Further, encrypted video signal 52 can be included in a digital audio/video file, transferred from a storage medium such as a server memory, magnetic tape, magnetic disc or optical disc, or can be included in a streaming audio or video signal that is transmitted over a public or private network such as a wireless or wired data network, local area network, wide area network, metropolitan area network or the Internet.

Video player 10 can be coupled to display video content from encrypted video signal 52 on its own optional display device 204 display device such as a liquid crystal display, light emitting diode (LED) backlit display, or other display device, including speakers. In addition or in the alternative, the video player 10 optionally couples to an external display device such as computer monitor, television receiver, external speakers, headphones, et cetera. In an embodiment of the present invention, interface module 206 includes a wired link for coupling to media content provider 50 to transfer the encrypted video signal 52 either directly or through one or more intermediate devices. The coupling can include a serial or parallel connection such as an Ethernet connection, Universal Serial Bus (USB) connection, an Institute of Electrical and Electronics Engineers (IEEE) 1394 (Firewire) connection, small computer serial interface (SCSI) connection or other wired connection that operates in accordance with either a standard or custom interface protocol.

In addition or in the alternative, the interface module 206 includes a wireless link for coupling to the media content provider 50 either directly or indirectly through one or more devices that operate in accordance with a wireless network protocol such as 802.11a,b,g,n (referred to generically as 802.11x), Bluetooth, Ultra Wideband (UWB) or other wireless connection that operates in accordance with either a standard or custom interface protocol in order to transfer encrypted video signal 52 from one or more of these other devices.

In addition, interface module 206 can include a port, such as a card slot or other connection that is coupleable to a removable memory device such as a memory stick, memory card, flash memory device or other memory that transfers encrypted video signal 52 via file transfer of a compressed digital video file. User input interface 212 includes one or more buttons, a keyboard, a touch pad, a touch screen, thumb wheel and/or other user interface devices that generate signals in response to the action of the user for allowing the user to interact with the device, by making selections, entering data, etc.

Processing module 200 can be implemented using a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 202. Memory module 202 may be a single memory device or a plurality of memory devices. Such a memory device can include a hard disc drive or other disc drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Memory module 202 can store a resident video player application, user selections, preferences and other user attribute data, application data corresponding to other applications of the video player 10, the operating system, other software and firmware, and other data. Additionally, memory module 202 can store a plurality of compressed video files corresponding to stored instances of encrypted video signal 52. As discussed above, memory module 202 can include a plurality of different memory devices such as random access memory (RAM), read only memory (ROM), and removable storage devices. In an embodiment of the present invention, memory module 202 includes a flash memory card, memory stick or other flash memory device.

The encrypted video signal 52 can be encrypted for the purposes of digital rights management or otherwise to prevent encrypted video signal 52 being accessed, either partially or fully, by users that are not in possession of the decryption key required to decrypt the encrypted data. Cryptography module 210 operates to decrypt the encrypted video signal 52. In particular, cryptography module 210 can be used in conjunction with conventional decryption of an encrypted signal and/or processing associated with authentication, digital signatures, digital rights management and other scrambling and descrambling of a signal. In particular, cryptography module 210 can use digital signatures in association with a digital rights management system in association with the acquisition of encrypted video signal 52. It should be noted that cryptography module 210 can be implemented via hardware, software or firmware. The other modules of video player 10 can also be implemented in software, firmware or hardware, depending on the particular implementation of processing module 200.

In a mode of operation, cryptography module 210 authenticates the video player 10, and negotiates the sharing of keys with the media content provider 50, based on a private key that is stored and processed as a plurality of key fragments. In a further mode of operation, the video player 10 receives the encrypted video signal 52 from media content provider 50. The encrypted video signal 52 is decrypted by cryptography module 210 using a plurality of key fragments, for instance, in association with the playback of the associated audio and video content. The operation of cryptography module 210 will be described in greater detail, including several optional functions and features, in conjunction with FIGS. 3-10 that follow.

Figure 3:
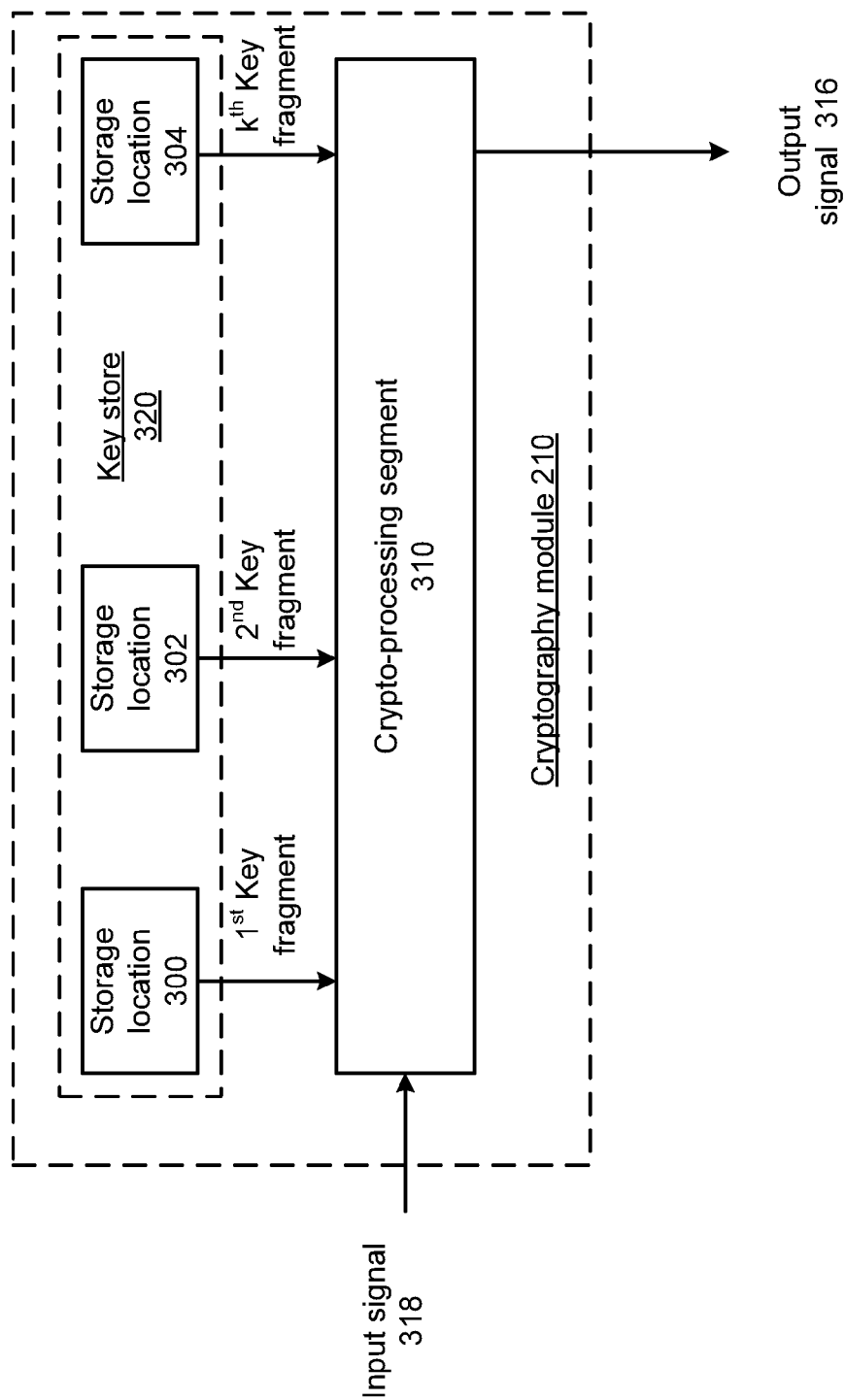
FIG. 3 presents a block diagram representation of cryptography module 210 in accordance with an embodiment of the present invention.

FIG. 3 presents a block diagram representation of cryptography module 210 in accordance with an embodiment of the present invention. In particular, cryptography module 210 includes a key store 320 having storage locations (300, 302, 304 . . . ) for storing a key as k key fragments. Crypto-processing segment 310 operates based on the k key fragments to process a signal, such as input signal 318 to produce an output signal 316.

As will be described in greater detail in conjunction with FIG. 5, the k key fragments are generated from the full key, such as a private key of a public key cryptosystem. The key store 320 can be a portion of memory module 202 and store the k key fragments in diverse locations. The fragmentation of the private key into a plurality of k key fragments and their diverse storage protects the key from discovery by hackers of the video player 10 or other unauthorized users. In particular, all of the k key fragments need to be discovered to reconstruct the full key, increasing the security of the system.

As discussed in conjunction with FIG. 2, cryptography module 210 can be used in conjunction with conventional decryption of an encrypted signal as well as with authentication, digital signatures, digital rights management and other scrambling and descrambling of a signal.

Consider the application of cryptography module 210 to a system employing the Elliptic Curve Digital Signature Algorithm (ECDSA) that implements a digital signature using Elliptic Curve Cryptography (ECC) to authenticate the video player 10 to a media content provider 50. In such as system, the two parties agree on a set of curve parameters (q,FR,a,b,[DomainParameterSeed],G,n,h,) where q is the field size; FR is an indication of the basis used; a and b are two field elements that define the equation of the curve; DomainParameterSeed is an optional bit string that is present if the elliptic curve was randomly generated in a verifiable fashion; G is a base point of prime order on the curve (i.e., $G=(x_G, y_G)$); n is the order of the point G; and h is the cofactor (which is equal to the order of the curve divided by n).

The video player 10 has a key pair suitable for elliptic curve cryptography, consisting of a private key $d_A$ (a randomly selected integer in the interval [1, n−1]) and a public key $Q_A$ (where $Q_A=d_A G$). Let $L_n$ be the bit length of the group order n. The video player authenticates itself to the media content provider 50 by signing a message using its keys. The process of signing a message M, includes the following steps:

1. Calculate e=HASH(M), where HASH is a cryptographic hash function, such as a secure hash algorithm (SHA-0, SHA-1, etc.), and let z be the $L_n$ leftmost bits of e.
2. Select a random integer p from [1, n−1].
3. Calculate $r=x_1$ modulo n, where $(x_1, y_1)=pG$. If r=0, go back to step 2.
4. Calculate $s=p^{-1}(z+rd_A)$ modulo n. If s=0, go back to step 2.
5. The signature is the pair (r,s).

When computing s, the string z resulting from HASH(M) shall be converted to an integer. In this particular algorithm, z can be greater than n but not longer.

In accordance with this example, the message M is the input signal 318 and the signature pair (r,s) is the output signal 316. As discussed above, the cryptography module 210 stores the private key $d_A$ that has been bifurcated into a set of k key fragments $[m_1, m_2, m_3, \ldots M_k]$ having the property that, $$d_A = (m_1 + m_2 + m_3 + \ldots + m_k) \bmod n$$

Consider further that the k key fragments are stored in different locations in an executable file that implements the operation of crypto-processing segment 310 in software or firmware. In operation, the crypto-processing segment 310 performs Step 4 of the process above using the k key fragments, instead of the full private key $d_A$. In particular, the crypto-processing segment 310 can compute either:

$$s = p^{-1}(z + rm_1 + rm_2 + rm_3 + \ldots + rm_k) \bmod n$$

or $$s = (p^{-1}z + p^{-1}rm_1 + p^{-1}rm_2 + p^{-1}rm_3 + \ldots + p^{-1}rm_k) \bmod n$$

In an embodiment of the present invention, the crypto-processing segment 310 retrieves the k key fragments one at a time. The full key $d_A$ is never assembled and can only be reassembled by an unauthorized user locating and accessing all k key fragments.

The authentication process is completed when the media content provider 50 authenticates the video player 10 by authenticating the signature pair (r,s). In addition, once the video player 10 has been authenticated to the media content provider 50, the two parties can perform a key exchange, such as a Elliptic Curve Diffie-Hellman (ECDH) key exchange, to establish the keys used in conjunction with the encryption and decryption of encrypted video signal 52. As above, the parties have agreed on a set of ECC curve parameters. Also, each party uses a key pair suitable for elliptic curve cryptography, consisting of a private key d (a randomly selected integer in the interval [1, n−1]) and a public key Q (where Q=dG). Considering the key pair of video player 10 to be $(d'_A, Q'_A)$ and the key pair of the media content provider 50 to be $(d'_B, Q'_B)$. The key exchange occurs as follows:

1. The video player 10 computes $(x_k, y_k) = d'_A Q'_B$.
2. The media content provider 50 computes $k = d'_B Q'_A$.
3. The shared key is $x_k$ (the x coordinate of the point).

As before, cryptography module 210 stores the private key $d'_A$ that has been bifurcated into a set of k key fragments $[m'_1, m'_2, m'_3, \ldots m'_k]$ having the property that, $$d'_A = (m'_1 + m'_2 + m'_3 + \ldots + m'_k) \bmod n$$

Crypto-processing module 310 performs step 1 as follows:

$$(x_k, y_k) = (Q'_B * m'_1 Q'_B * m'_2 + Q'_B * m'_3 + \ldots + Q'_B * m'_k) \bmod n$$

The number calculated by both parties is equal, because $d'_A Q'_B = d'_A d'_B G = d'_B d'_A G = d'_B Q'_A$. It should be noted that the key pairs can be static, in this case:

$$(d'_A, Q'_A) = (d_A, Q_A)$$

However, ephemeral session keys can be employed for each session and/or each new video program, etc. In this case a new key pair $(d'_A, Q'_A)$ and a new set of k key fragments $[m'_1, m'_2, m'_3, \ldots, m'_k]$ can be created each time.

The operation of the cryptography module 210 can be described in conjunction with a further example. Consider a case where the encrypted video signal 52 C, has been encrypted via a public key (e, n) of a Rivest, Shamir and Adelman (RSA) cryptography system modulo n having a corresponding private key d. In a standard decryption, the decrypted data D, can be computed as follows:

$$D = (C^d) \bmod n$$

In accordance with the present invention, the decryption key d has been bifurcated into k key fragments having the property that, $$d = (m_1 + m_2 + m_3 + \ldots + m_k) \bmod \phi(n)$$

where $\phi(n) = (p-1)(q-1)$, Euler's totient function and n=pq. The reason for this is that, $$ed \bmod \phi(n) = 1$$

Therefore the value of d can be computed as:

$$d = e^{-1} \bmod \phi(n)$$

or, in other words, $$de - 1 = w\phi(n), \text{ for some integer } w,$$

and $$(m_1 + m_2 + m_3 + \ldots + m_k) = l * \phi(n) + d, \text{ for some integer } l,$$

and further, $$e * (m_1 + m_2 + m_3 + \ldots m_k) = w * \phi(n) + e * l * \phi(n) + 1$$

Considering a plaintext message, M, $$C^{(m1+m2+m3+\ldots+mk)} = M^{e*(m1+m2+m3+\ldots+mk)} \text{ modulo } n$$

$$= M^{(w/\phi(n)+e*l*\phi(n)+1)} \text{ modulo } n$$

And from the relationships above, and Euler's theorem, $$= M$$

meaning, that the message M can be recovered.

Therefore, the decrypted data D, can be computed as:

$$D = (C^{m1} * C^{m2} * C^{m3} * \ldots * C^{mk}) \text{ modulo } n$$

where the symbol * is used to represent the mathematical product.

Consider further that the k key fragments are stored in different locations in an executable file that implements the operation of crypto-processing segment 310 in software or firmware. In particular, In accordance with this further example, the crypto-processing segment 310 operates as follows.
1. Retrieve the $1^{st}$ key fragment, $m_1$
2. Compute $R_1 = (C^{m1}) \text{ modulo } n$
3. For i=2 ... k, do
   retrieve the $i^{th}$ key fragment $m_i$
   compute $R_i = (R_{i-1} C^{mi}) \text{ modulo } n$
4. $D = R_k$ As in the prior examples, the crypto-processing segment 310 retrieves the k key fragments one at a time and sequentially processes encrypted data C to generate the decrypted data D. The full key d is never assembled and can only be reassembled by an authorized user locating and accessing all k key fragments.

In yet a further example, the encrypted video signal 52 is encrypted via AES using one or more keys C that are encrypted via RSA. In this case, the video player 10 decrypts the AES key or keys C as described above and then uses the decrypted AES keys to decrypt the encrypted video signal 52 in accordance with AES decryption. The AES decryption can be performed by cryptography segment 310 or via another module and optionally additional module of either cryptography module 210 or video player 10.

It should also be noted that, in addition to the direct decryption of encrypted content and decryption of encrypted keys, the use of bifurcated keys in RSA processing can be utilized in conjunction with authentication, key sharing, digital rights management and other methodologies that employ RSA cryptography. Further, while the operation of cryptography module 210 has been illustrated in conjunction with ECDSA, ECDH, and other ECC and RSA cryptosystems, the methodologies presented herein can similarly be employed in other discrete-log based cryptosystems such as DSA and Diffie-Helman as well as other cryptography systems.

In accordance with the examples described above, the k key fragments are stored in key store 320 so as to be hidden from a hacker or other party that is unauthorized to access the key, to inhibit the reassembly of the full key. It should be noted that one or more obfuscation techniques can be employed to store the k key fragments in key store 320, such as further encoding, encryption or scrambling of the key fragments, the use of randomly selected or pseudo-randomly selected storage locations (300, 302, 304, ... ), the insertion of the k key fragments within executable code or other files of video player 10 or the implementation of other obfuscation techniques.

Figure 4:
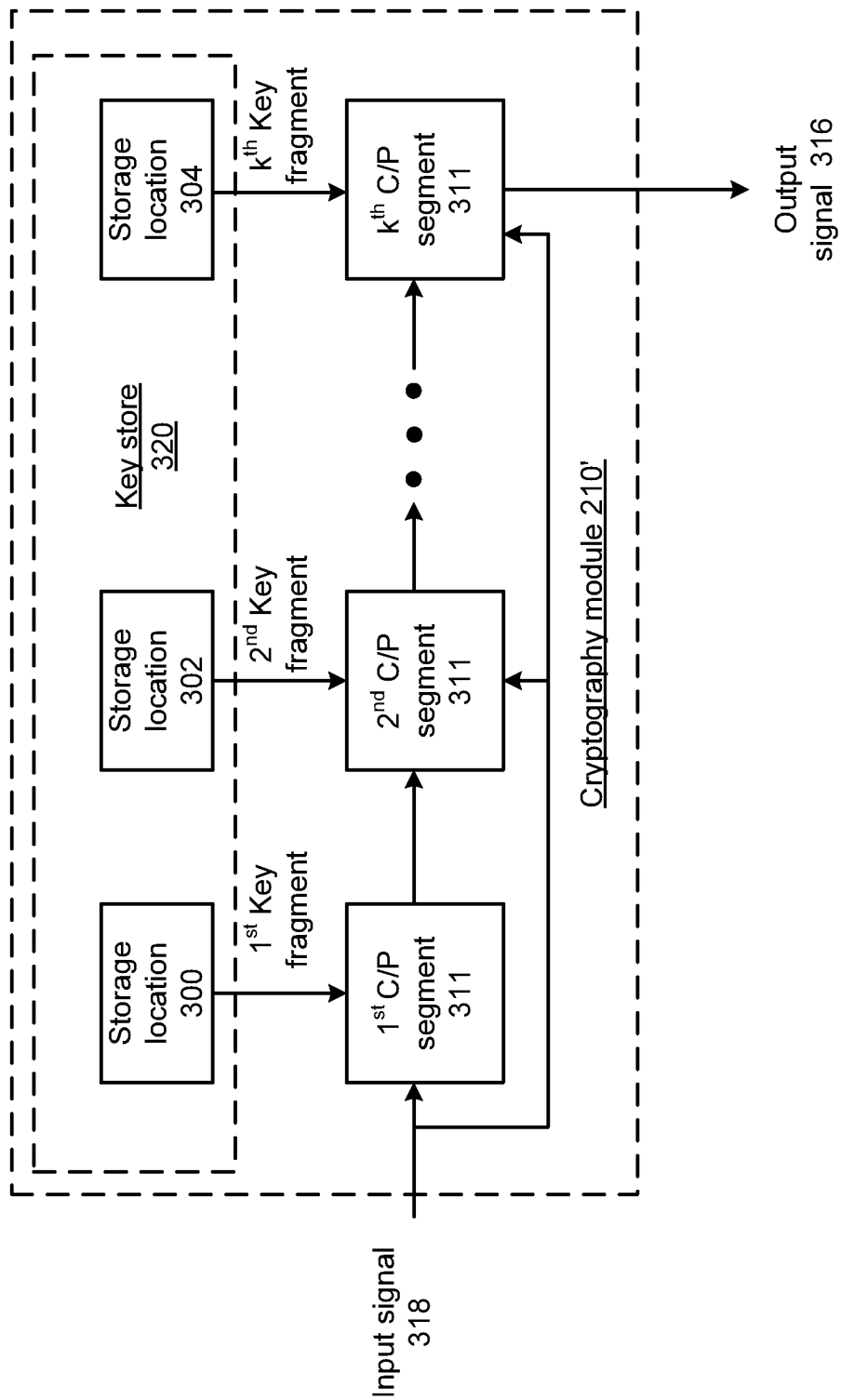
FIG. 4 presents a block diagram representation of cryptography module 210' in accordance with an embodiment of the present invention.

FIG. 4 presents a block diagram representation of cryptography module 210' in accordance with an embodiment of the present invention. In particular, cryptography module 210' performs a similar function to cryptography module 210 and includes similar elements that are referred to by common reference numerals. In this embodiment however, the operation of crypto-processing segment 310 is distributed among a plurality of crypto-processing segments 311.

The operation of the cryptography module 210' can be described further in conjunction with another example presented in conjunction with FIG. 3. Consider a case where the input signal 52 C, has been encrypted via a public key (e, n) of a Rivest, Shamir and Adelman (RSA) cryptography system modulo n having a corresponding private key d. In accordance with the present invention, the decryption key d has been bifurcated into k key fragments having the property that, $$d = (m_1 + m_2 + m_3 + \ldots + m_k) \text{ modulo } \phi(n)$$

Consider further that the k key fragments are stored in different locations in an executable file that implements the operation of crypto-processing segments 311 in software or firmware. In particular, In accordance with this further example, the crypto-processing segments 311 operate as follows.

In accordance with this example, the $1^{st}$ crypto-processing segment 311 operates as follows.
1. Retrieve the $1^{st}$ key fragment, $m_1$
2. Compute $R_1 = (C^{m1}) \text{ modulo } n$ The $i^{th}$ crypto-processing segment 311 (i=2 ... k) each operate to
1. Retrieve the $i^{th}$ key fragment $m_i$
2. Compute $R_i = (R_{i-1} C^{mi}) \text{ modulo } n$ With the final decrypted result:

$$D = R_k$$

While the operation of cryptography module 210' has been illustrated in conjunction with ECC and RSA cryptosystems, the methodologies presented herein can similarly be employed to the decryption of other encrypted signals and further in conjunction with the processing of signatures, authentication, key sharing, etc.

In the example below, the product used in conjunction with ECDSA.

$$s = p^{-1}(z + rm_1 + rm_2 + rm_3 + \ldots + rm_k) \text{ modulo } n$$

is computed sequentially as follows:
1. Retrieve the $1^{st}$ key fragment, $m_1$
2. Compute $R_1 = (rm_1) \text{ modulo } n$ The $i^{th}$ crypto-processing segment 311 (i=2 ... k) each operate to
1. Retrieve the $i^{th}$ key fragment $m_i$
2. Compute $R_i = (R_{i-1} + rm_i) \text{ modulo } n$ With the final product being computed as:

$$s = p^{-1}(z + R_k) \text{ modulo } n$$

In accordance with any of the examples above, any of the sequential processing by crypto-processing segments 311 can include random delays to avoid the appearance of $m_i$ in a common memory location at periodic intervals. Considering one of the examples above, where the product $s = p^{-1}(z + rm_1 + rm_2 + rm_3 + \ldots + rm_k)$ modulo n is computed sequentially:
1. Retrieve the $1^{st}$ key fragment, $m_1$
2. Compute $R_1 = (r\,m_1) \text{ modulo } n$ The $i^{th}$ crypto-processing segment 311 (i=2 ... k) each operate to
1. Delay an amount $\Delta_1$, where $\Delta_i$ is a random or pseudo-randomly generated delay
2. Retrieve the $i^{th}$ key fragment $m_i$
3. Compute $R_i = (R_{i-1} + r\,m_i) \text{ modulo } n$ With the final product being computed as:

$$s = p^{-1}(z+R_k) \text{ modulo } n$$

While a single example is presented above, random delays can be inserted in the sequential processing in other ways, and in other examples of sequential processing to similarly avoid the appearance of $m_i$ in a common memory location at periodic intervals.

Figure 5:
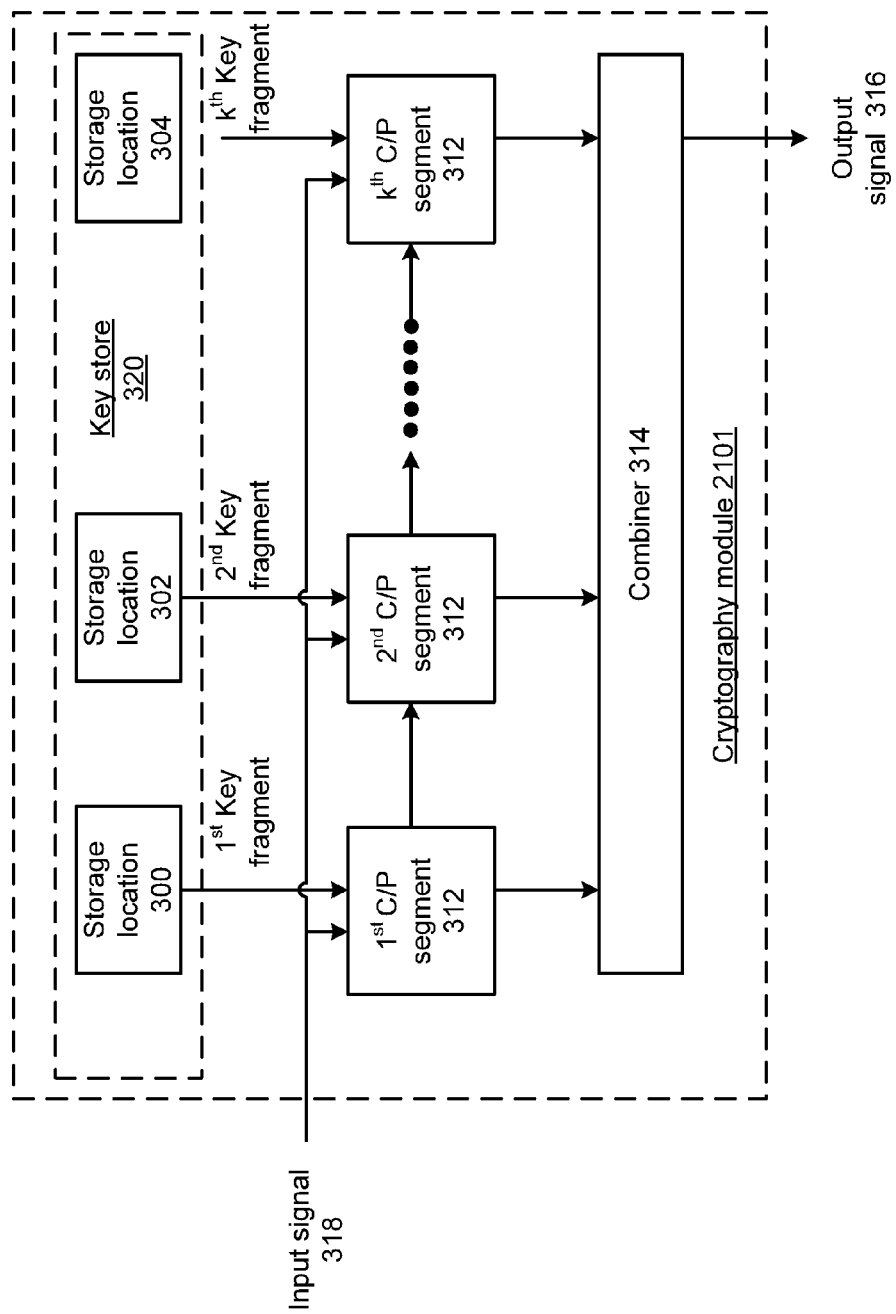
FIG. 5 presents a block diagram representation of cryptography module 210" in accordance with an embodiment of the present invention.

FIG. 5 presents a block diagram representation of cryptography module 210" in accordance with an embodiment of the present invention. In particular, cryptography module 210" is presented performs a similar function to cryptography modules 210 and includes similar elements that are referred to by common reference numerals. In this embodiment however, the operation of crypto-processing segment 310 is distributed among a plurality of crypto-processing segments 312 that operate in parallel and a combiner is employed to generate the final result.

The operation of the cryptography module 210" can be described further in conjunction with another example presented in conjunction with FIG. 3. Consider a case where the input signal 52 C, has been encrypted via a public key (e, n) of a Rivest, Shamir and Adelman (RSA) cryptography system modulo n having a corresponding private key d. In accordance with the present invention, the decryption key d has been bifurcated into k key fragments having the property that, $$d = (m_1+m_2+m_3+\ldots+m_k) \text{ modulo } \phi(n)$$

Consider further that the k key fragments are stored in different locations in an executable file that implements the operation of crypto-processing segments 312 in software or firmware. In accordance with this example, the $i^{th}$ crypto-processing segment 312, (i=1 ... k) each operate to:
1. Retrieve the $i^{th}$ key fragment $m_i$
2. Compute $R_i = (C^{m_i})$ modulo n With the final decrypted result by the combiner 214 operating to generate the product of the results for each fragmented key as follows:

$$D = (R_1 R_2 R_3 \ldots R_k) \text{ modulo } n$$

While the operation of cryptography module 210" has been illustrated in conjunction with ECC and RSA cryptosystems, the methodologies presented herein can similarly be employed to the decryption of other encrypted signals and further in conjunction with the processing of signatures, authentication, key sharing, etc.

In the example below, the product $s=p^{-1}(z+r\, m_1+r\, m_2+r\, m_3+\ldots+rm_k)$ mod n used in conjunction with ECDSA is computed in parallel as follows. The $i^{th}$ crypto-processing segment 312, (i=1 ... k) each operate to:
1. Retrieve the $i^{th}$ key fragment $m_i$
2. Compute $R_i = (r\, m_i)$ modulo n The final product is generated by the combiner 214 operating to sum the results for each fragmented key as follows:

$$s = p^{-1}(z+R_1+R_2+R_3+\ldots+R_k) \text{ modulo } n$$

Figure 6:
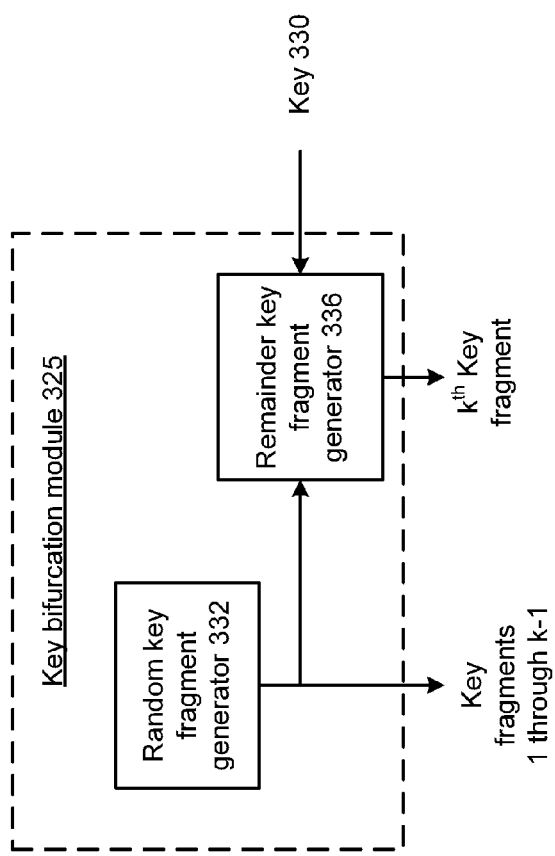
FIG. 6 presents a block diagram representation of key bifurcation module 325 in accordance with an embodiment of the present invention.

FIG. 6 presents a block diagram representation of key bifurcation module 325 in accordance with an embodiment of the present invention. A key bifurcation module 325 is presented that includes a random key fragment generator 332 and a remainder key fragment generator 336. In particular, the key bifurcation module 325 generates the k key fragments based on a particular key 330, including a plurality of random key fragments and a remainder key fragment.

In operation, the random key fragment generator 332 includes a random number or pseudorandom number generator that generates one or more random numbers and further that generates k−1 key fragments based on these random numbers. For example, random key fragment generator 332 can generate k−1 key fragments directly as k−1 random numbers, of the same or similar size or of different sizes. In a further example, one or more random numbers can be generated to seed a deterministic engine, such as a state machine, feedback shift register or other hardware or software that selects the k−1 key fragments based on the seeds.

Remainder key fragment generator 336 generates the $k^{th}$ key fragment, a remainder key fragment, based on a modulo remainder computed from the k−1 key fragments and a key. Considering the key d to represent any of the key examples presented in conjunction with FIGS. 3-5, $$d = (m_1+m_2+m_3+\ldots+m_{k-1}+m_k) \text{ modulo } n$$

or $$d = (m_1+m_2+m_3+\ldots+m_{k-1}+m_k) \text{ modulo } \phi(n)$$

In this case, the final key fragment can be generated deterministically based on the k−1 key fragments and the decryption key, as follows:

$$m_5 = (d-(m_1+n_2+m_3+\ldots+m_{k-1})) \text{ modulo } n$$

or $$m_k = (d-(m_1+m_2+m_3+\ldots+m_{k-1})) \text{ modulo } \phi(n)$$

As discussed in conjunction with FIGS. 3-5, the k key fragments can be stored in different locations in an executable file that implements the operation of crypto-processing segment 310 in software or firmware. Key fragment generator 336 can be incorporated or coupled to a compiler that generates the executed code that contains the key fragments in order to "hide" the k key fragments in portions of that code.

In other implementations, the key fragment generator 336 can be a stand-alone device or routine. While the k key fragments have been primarily discussed as being stored in an executable file, storage of the k key fragments in diverse storage locations that hold other data files or other file types is likewise possible.

Figure 7:
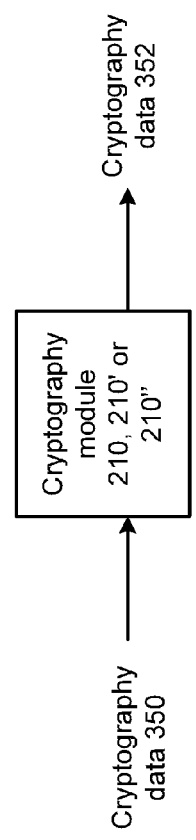
FIG. 7 presents a block diagram representation of the operation of cryptography module 210 or 210' in accordance with an embodiment of the present invention.

FIG. 7 presents a block diagram representation of the operation of cryptography module 210, 210' or 210" in accordance with an embodiment of the present invention. While the previous examples have been described primarily in conjunction with the authentication and key sharing between a video player and a media content provider and the decryption of an encrypted video signal such as encrypted video signal 52, the functions and features of cryptography modules 210, 210' and 210" can likewise be employed to other types of encrypted data including, but not limited to, audio information, text, other media content, communications, stored data, and any other form of encrypted data, such as encrypted data 350 and further to other signatures, authentication, key sharing arrangements, digital rights management and to other forms of cryptography. In operation, cryptography module 210, 210' and 210" generates cryptography data 352 from cryptography data 350 using bifurcated keys stored and processed in accordance with any of the processes or techniques that have been previously described.

FIG. 8 presents a flowchart representation of a method in accordance with an embodiment of the present invention. In particular a method is presented for use in conjunction with one or more of the functions and features presented in conjunction with FIGS. 1-7. In step 400 a key is stored as k key fragments including a plurality of random key fragments and a remainder key fragment. In step 402, an input signal is processed via at least one crypto-processing segment, based on the k key fragments, to produce an output signal.

In an embodiment of the present invention, the input signal is encrypted via a Rivest Shamir Adelman (RSA) encryption and the at least one crypto-processing segment performs a modular exponentiation based on the k key fragments. The processing of the input signal can include sequentially processing the input signal to produce the output signal.

The processing of the encrypted signal can include processing the input signal in parallel to a plurality of fragmented key results and combining the plurality of fragmented key results to produce the output signal. Combining the plurality of fragmented key results can include generating a product of the plurality of fragmented key results.

FIG. 9 presents a flowchart representation of a method in accordance with an embodiment of the present invention. In particular a method is presented for use in conjunction with one or more of the functions and features presented in conjunction with FIGS. 1-8. In step 410, a private key is stored as k key fragments including a plurality of random key fragments and a remainder key fragment. In step 412, a message is processed in accordance with elliptic curve digital signature algorithm (ECDSA) via at least one crypto-processing segment, based on the k key fragments, to produce a signed message.

In an embodiment of the present invention, the k key fragments include a plurality of random key fragments and can further include and a remainder key fragment that is based on the plurality of random key fragments. The at least one crypto-processing segment can generate a modular product based on corresponding ones of the k key fragments. Processing the message can include sequentially processing the encrypted signal to produce the signed message.

Processing the message can include processing the message in parallel to generate a plurality of fragmented key results and combining the plurality of fragmented key results to produce the signed message. Combining the plurality of fragmented key results can include generating a sum of the plurality of fragmented key results.

Figure 10:
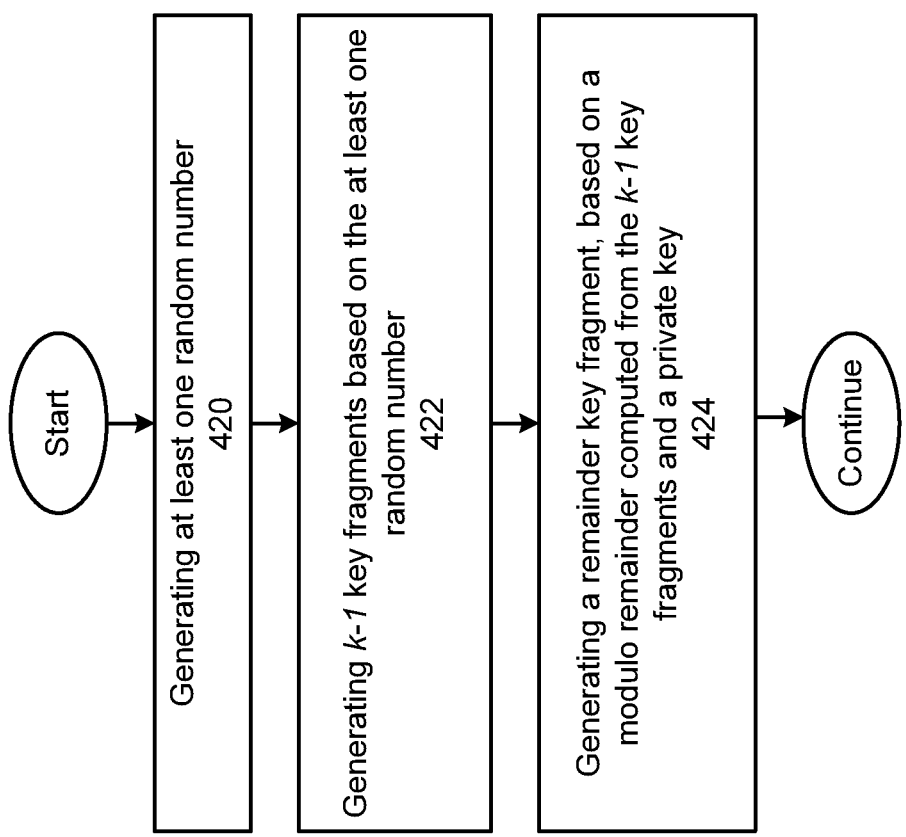
FIG. 10 presents a flowchart representation of a method in accordance with an embodiment of the present invention.

FIG. 10 presents a flowchart representation of a method in accordance with an embodiment of the present invention. In particular a method is presented for use in conjunction with one or more of the functions and features presented in conjunction with FIGS. 1-9. In step 420, at least one random number is generated. In step 422, k-1 key fragments are generated based on the at least one random number. In step 424, a remainder key fragment is generated based on a modulo remainder computed from the k-1 key fragments and a key.

The key can include a private key of a public key cryptosystem such as a Rivest Shamir Adelman (RSA), a elliptic curve cryptography (ECC) or other cryptosystem.

In preferred embodiments, optional circuit components can be implemented using 0.35 micron or smaller CMOS technology. Provided however that other circuit technologies, both integrated or non-integrated, may be used within the broad scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing a cryptography module for processing data. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention

What is claimed is:

1. A cryptography module comprising:
a key store having a plurality of storage locations for storing a private key as k key fragments that include k-1 key segments and a remainder key fragment, where k is greater than 2, wherein the k-1 key segments are generated as random key segments, and wherein the remainder key fragment is generated based on the k-1 key segments; and
at least one crypto-processing segment, coupled to the key store, operating based on the k key fragments for processing a message in accordance with elliptic curve digital signature algorithm (ECDSA) to produce a signed message.

2. The cryptography module of claim 1 wherein the at least one crypto-processing segment generates a modular product based on corresponding ones of the k key fragments.

3. The cryptography module of claim 1 wherein the at least one crypto-processing segment sequentially processes the message based on the k key fragments to produce the signed message.

4. The cryptography module of claim 1 wherein the at least one crypto-processing segments includes a plurality of crypto-processing segments that operate in parallel to process the message into a plurality of fragmented key results and wherein the cryptography module further comprises:

a combiner, coupled to the plurality of crypto-processing segments, that combines the plurality of fragmented key results to produce the signed message.

5. The cryptography module of claim 4 wherein the combiner generates a sum of the plurality of fragmented key results.

6. The cryptography module of claim 1 wherein:

$$d=(m_1+m_2+m_3+\ldots+m_k) \text{modulo } n$$

where $m_i$ represents the ith of the k key fragments, d represents the key and n is an integer.

7. A method comprising:
storing a private key in k key fragments that include k−1 key segments and a remainder key fragment, where k is greater than 2, wherein the k−1 key segments are generated as random key segments, and wherein the remainder key fragment is generated based on the k−1 key segments; and
processing a message in accordance with elliptic curve digital signature algorithm (ECDSA) via at least one crypto-processing segment, based on the k key fragments, to produce a signed message.

8. The method of claim 7 wherein the at least one crypto-processing segment generates a modular product based on corresponding ones of the k key fragments.

9. The method of claim 7 wherein processing the message includes sequentially processing the message to produce the signed message.

10. The method of claim 7 wherein processing the message includes:
processing the message in parallel to generate a plurality of fragmented key results; and
combining the plurality of fragmented key results to produce the signed message.

11. The method of claim 7 wherein combining the plurality of fragmented key results includes generating a sum of the plurality of fragmented key results.

12. The method of claim 7 wherein:

$$d=(m_1+m_2+m_3+\ldots+m_k) \text{modulo } n$$

where $m_i$ represents the ith of the k key fragments, d represents the key and n is an integer.

13. A method comprising:
generating at least one random number via a random number generator;
generating k−1 key fragments via a device based on the at least one random number, where k is greater than 2; and
generating a remainder key fragment via the device, based on a modulo remainder computed from the k−1 key fragments and a key;
wherein the key includes a private key of a elliptic curve digital signature algorithm (ECDSA).

* * * * *